June 30, 1953     E. W. SMITH     2,643,736

STRIPPING VANE FOR SEPARATORS

Filed July 30, 1951

INVENTOR.
Edwin W. Smith
BY
ATTORNEY

Patented June 30, 1953

2,643,736

UNITED STATES PATENT OFFICE 2,643,736

STRIPPING VANE FOR SEPARATORS

Edwin W. Smith, Dallas, Tex.

Application July 30, 1951, Serial No. 239,299

11 Claims. (Cl. 183—75)

This invention relates to separators and more particularly to a separator for extracting liquid mist from a gas.

In many applications, liquid mist contained and suspended in a gas must be extracted or separated from the gas either because the gas must be freed of the mist before it can be utilized or because the liquid forming the mist is valuable and must be recovered from the gas. An example of the former reason for separating the mist from the gas is found in various chemical processes in which the gas must be free of a mist formed of droplets of water. An example of the latter reason is found in gasoline plants in which valuable oil passing out in the form of mist with exhaust gasses from absorbers must be recovered. Conventional mist extractors or separators employ a core of stripping vanes which forms a plurality of sinuous paths through which the gas must pass. The particles or droplets of mist contact the surface of the stripping vanes as the gas passes through the separator and collect on such vanes, eventually flowing down the vanes to the bottom of the separator.

It is desirable that the stripping vanes be formed of identical, easily assembled sections so that a single die may be employed to make the stripping vanes. Moreover, the sections should be so formed that the stripping vanes assembled therefrom are provided with a plurality of vertical pockets down which the collected liquid may flow to the bottom of the separator.

Accordingly, it is one object of the invention to provide a new and improved separator for extracting mist from a gas, or gaseous vapors or fluids.

It is another object of the invention to provide a new and improved separator for extracting mist from a gas, said separator having a core of spaced stripping vanes formed of identical vertical sections.

It is still another object of the invention to provide a new and improved separator for extracting mist from a gas, said separator having a core of spaced stripping vanes providing a plurality of vertical liquid collecting and conducting pockets.

It is a further object of the invention to provide a new and improved stripping vane section, a plurality of which can be easily assembled into a stripping vane.

It is a still further object of the invention to provide a new and improved stripping vane section, the stripping vanes formed from the sections being easily assembled into a core providing a plurality of sinuous paths and having projections extending into the paths to create turbulence and cause amplified impingement of the gaseous fluids against the vane sections as said fluids pass through the paths.

It is another object of the invention to provide a new and improved elongate stripping vane section having a curved portion at one side edge thereof forming a vertical liquid collecting pocket or channel.

It is another object of the invention to provide a new and improved elongate stripping vane section, a plurality of which can be easily assembled into a sinuous stripping vane of any desired length and height and having a plurality of spaced liquid collecting pockets.

In brief, in one embodiment, the new and improved separator for extracting liquid mist from a gas includes an elongate vertical tank provided adjacent its upper end with an inlet on one side and an outlet on the other side which is substantially aligned with the inlet. A core made of a plurality of spaced vertical stripping vanes is disposed in the tank with their upper portions placed between the inlet and the outlet in order to divide the mist laden gas into a plurality of narrow vertical ribbons flowing from the inlet to the outlet through sinuous paths formed by the stripping vanes. Each stripping vane is formed of a plurality of identical elongate vertical sections which are riveted together to form the stripping vane. Each section is so formed that the assembled stripping vanes provide a plurality of vertical pockets in which droplets of mist deposited on the vanes are collected and directed downwardly to the bottom of the tank.

Additional objects and advantages of the invention will be readily apparent from the reading of the following description of a device constructed in accordance with the invention, and reference to the accompanying drawings thereof, wherein.

Figure 1:
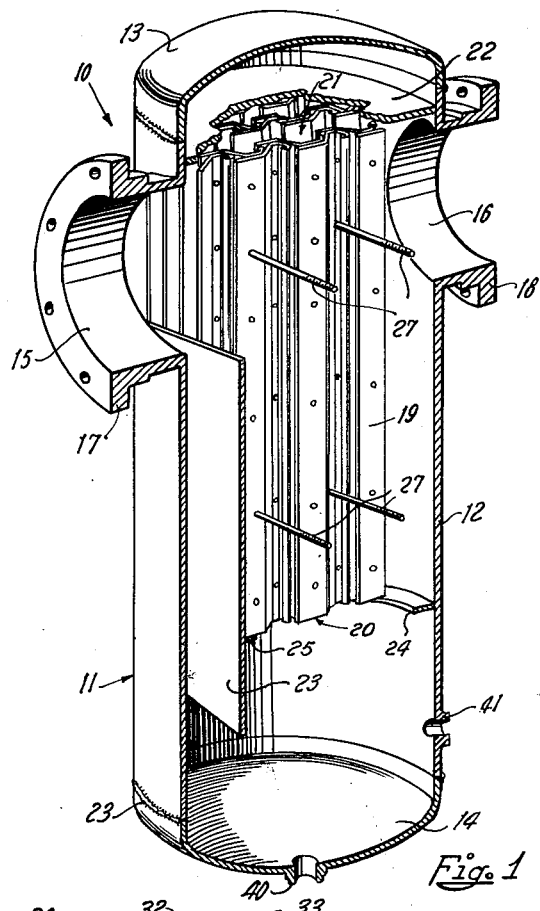
Figure 1 is a perspective sectional view, with some parts broken away and some parts removed, of one embodiment of a liquid mist separator.

In the drawings, the numeral 10 designates a liquid mist separator 10 which includes a tank 11 having a cylindrical vertical main section or body 12 whose upper and lower ends are closed by a cap or top 13 and a bottom 14 which are welded to the main section. The main section is provided with an inlet 15 and an outlet 16 which are disposed on opposite sides of the main section adjacent the upper end thereof. The inlet and outlet are provided with conventional annular flanges 17 and 18, respectively, by means of which the separator may be connected in a gaseous fluid flow line.

A core 19 of stripping vanes 20 is disposed in the tank 11 with its upper portion between the inlet and outlet whereby the mist laden gas entering the tank through the inlet 15 is divided into a plurality of sections or ribbons which pass through the sinuous paths 21 formed by adjacent stripping vanes and then outwardly through the outlet 16. The droplets of mist are separated from the gaseous fluid and deposited on the stripping vanes in the course of the passage of the fluid through the core so that gas relatively free from mist is delivered to the outlet 16. A top plate 22 is secured to the upper end of the main section 12 of the tank by welding or the like and abuts the top of the core to prevent the gaseous fluids from passing over the top of the core. A vertical baffle plate 23, whose vertical side edges are also secured to the main section by welding or the like, is positioned at the front ends of the stripping vanes adjacent the inlet, and extends from a plane just below the inlet to a plane intermediate the lower end of the core and the bottom 14 of the tank, where it will be immersed in liquids trapped in the tank. The baffle plate serves to prevent the gaseous fluids entering through the inlet from by-passing the core 19 by flowing downwardly therebeneath. The top plate 22 and the baffle plate 23 thus insure that the gaseous fluid will flow directly through the core 19 of stripping vanes as it flows through the tank from the inlet to the outlet.

The core may be secured in the tank by welding or by supporting flanges 24 and 25 welded to the main section or body 12 and the baffle plate 23, respectively. These supporting flanges extend beneath the core 19 and are so positioned that opposite edges of the core may rest thereupon.

The core is composed of a plurality of stripping vanes 20 which are secured together and held in spaced relation by a plurality of studs 27 which extend through registering apertures in the stripping vanes. A spacer 28 mounted on its associated stud 27 is interposed between each pair of adjacent vanes to hold them in properly spaced relation. The studs are threaded at their opposite ends and provided with nuts 29 which secure the vanes and spacers rigidly to the studs.

Figure 2:
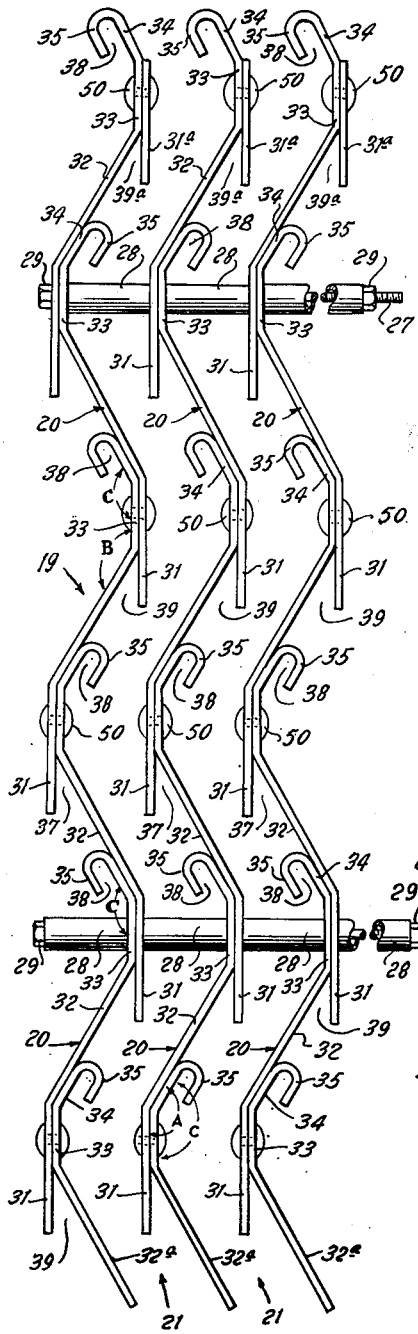
Fig. 2 is a top plan view of a portion of the core of stripping vanes employed in the separator of Figure 1.
Figure 3:
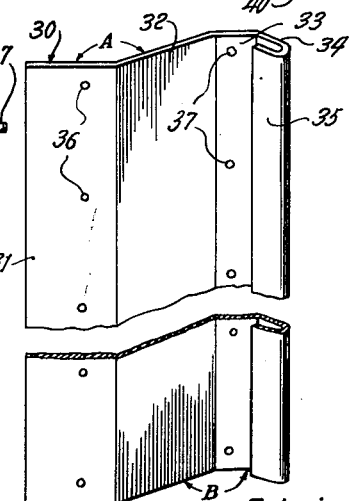
Figure 3 is a perspective view of one of the sections of which the stripping vanes are formed.

Each stripping vane is composed of a plurality of identical elongate stripping vane sections 30. Each section has a straight end portion 31, a first or intermediate inclined portion 32 which inclines at an obtuse angle A in one direction from the straight end portion 31, an intermediate straight portion 33 which extends at an obtuse angle B from the inclined portion 32 in the opposite direction from that in which the inclined portion 32 extends from the straight end portion 31, a second inclined portion 34 extends at an obtuse angle C from the intermediate straight portion 33, and a U-shaped or curved pocket portion 35 which is bent over to extend parallel to the second inclined portion 34. The obtuse angles A, B and C have been made equal, so that the sections 30 may be assembled in the manner illustrated in Figure 2.

Adjacent connected sections 30 have their curved pocket portions 35 on opposite sides of the stripping vane, and are so disposed that the straight end portion 31 of one section abuts the intermediate straight section 33 of the other section. The first or intermediate inclined portion 32 of one section then abuts the second inclined portion 34 of the next section adjacent the intermediate straight section of the other section. The end portion 31 and intermediate straight portion 33 are provided with a plurality of spaced apertures or rivet holes 36 and 37, respectively, which register in pairs when adjacent sections 30 are placed together in the manner illustrated in Figure 2. Rivets 50 extend through each pair of registering rivet holes 36 and 37 to secure the sections 30 rigidly to one another.

The straight end portions 31 of the vane sections are wider than the intermediate straight portions 33, so that the outer end of each straight end portion and the adjacent first inclined portion 32 of the next adjacent vane section form an angular fluid trapping pocket 39. The curved pocket portion 35 also provides a curved fluid trap or channel 38 extending throughout the vertical length of the vane. It will be noted that the pocket portion 35 and the outer end of the straight end portion 31 of each vane section project into the space defined by adjacent stripping vanes 20. These portions of the sections thus function to increase the turbulence of the narrow streams or ribbons of gaseous fluid passing through each sinuous path 21 formed by adjacent stripping vanes, thereby insuring that substantially all the droplets of mist carried by the gaseous fluid will come into contact with a surface of the stripping vanes and adhere thereto. The droplets tend to be driven into the fluid trapping pockets 39 and 38 by the stream of fluid, the droplets collecting on the surfaces of the stripping vanes being directed into the fluid trapping pockets 38 and 39 and flowing downwardly therein to the bottom of the tank.

The sections 30 at the entrant end of the core 19 may be cut off at the juncture of the straight end portions 31a and the first inclined portions 32a of such vane sections, and the cut off straight end portions may be riveted to the intermediate straight portions 33 of the vane sections at the opposite ends of the core to form angular fluid trapping pockets or channels 39a at the outlet end of the core. (See Fig. 2.)

The main section or body 12 of the tank is provided with a liquid outlet 41 through which the collected liquid flowing off the stripping vanes may be drawn out of the tank. The bottom 14 of the tank may also be provided with a drain outlet 40, if desired, for draining sludge or the like.

It will be seen that a liquid mist separator has been provided in which a core 19 disposed between the inlet and outlet of the separator tank divides the gaseous fluids flowing therethrough into a plurality of streams or ribbons, each which flows in a sinuous path 21 formed by a pair of spaced adjacent stripping vanes 20. It will also be seen that each stripping vane has a plurality of vertically extending fluid trapping channels 38 and 39 which project into the sinuous paths to create deflection and turbulence of the streams which brings substantially all droplets of mist carried by the gaseous fluid into contact with the surface of the stripping vanes. Moreover, it will be evident that each stripping vane is formed of a plurality of identical elongate vane sections 30 which may be formed in strips of great length by a single die and assembled into cores 19 of various dimensions. The vane sections may, of course, be cut into shorter lengths as may be necessary or desired.

The foregoing description of the invention is explanatory only, and changes in the details of the method and construction illustrated may be made by those skilled in the art, within the scope of the appended claims, without departing from the spirit of the invention.

What I claim and desire to secure by Letters Patent is:

1. An elongate stripper vane section comprising, a straight end portion lying in a vertical plane and extending from one side edge of the section; an inclined portion extending at an obtuse angle in one direction from said straight end portion; an intermediate straight portion of lesser width than the straight end portion extending at an obtuse angle from the inclined portion and lying in a plane parallel to said first mentioned vertical plane; and a second inclined portion of lesser width than said first inclined portion extending at an obtuse angle in the same degree and on the same side of the intermediate straight section as the first inclined portion and having an end remote from said straight end portion provided with a curved channel portion disposed within the obtuse angle formed between said second inclined portion and said intermediate straight portion, said obtuse angles all being equal in degree.

2. An elongate stripper vane section comprising, a straight end portion lying in a vertical plane and extending from one side edge of the section; an inclined portion extending at an obtuse angle in one direction from said straight end portion; an intermediate straight portion extending at an obtuse angle from the inclined portion and lying in a plane parallel to and spaced from said first-mentioned plane; and a second inclined portion extending at an obtuse angle in the same degree and on the same side of the intermediate straight section as the first inclined portion and having an end remote from said straight end portion provided with a curved channel portion disposed within the obtuse angle formed between said second inclined portion and said intermediate straight portion, said obtuse angles being equal.

3. A stripping vane including, a plurality of elongate sections, each of said sections including a straight end portion lying in a vertical plane and extending from one side edge of the section, a first inclined portion extending at an obtuse angle in one direction from said straight end portion, an intermediate straight portion of lesser width than the straight end portion extending at an obtuse angle in the opposite direction from the inclined portion and lying in a plane parallel to said first-mentioned plane, and a second inclined portion of lesser width than said first inclined portion extending at an obtuse angle in said opposite direction from the intermediate straight section and having an end portion extending arcuately in said opposite direction and then extending back toward said intermediate straight portion parallel to and spaced from said second inclined portion, said obtuse angles being equal, the intermediate straight portion of each section abutting and being secured to the straight end portion of an adjacent section, with the second inclined portion of said each section abutting the first inclined portion of the adjacent section, the straight end portion of said adjacent section extending beyond the first inclined portion of the section to which it is secured to form a pocket therewith.

4. A stripping vane including, a plurality of elongate sections, each of said sections including a straight end portion lying in a plane and extending from one side edge of the section, a first inclined portion extending at an obtuse angle in one direction from said straight end portion, an intermediate straight portion extending at an obtuse angle in the opposite direction from the inclined portion and lying in a plane parallel to said first mentioned plane, and a second inclined portion extending at an obtuse angle in said opposite direction from the intermediate straight section and having an end portion extending arcuately in said opposite direction and then extending back toward said intermediate straight portion parallel to and spaced from said second inclined portion, said obtuse angles being equal, the intermediate straight portion of each section abutting and being secured to the straight end portion of an adjacent section, with the second inclined portion of said each section abutting the first inclined portion of the adjacent section.

5. A core for a liquid mist extractor including, a plurality of vertical spaced stripping vanes rigidly secured to one another, the space between each pair of adjacent stripping vanes forming a sinuous gas path, each of said stripping vanes comprising a plurality of vertical elongate sections rigidly secured to one another, each of said sections having one vertical side portion extending back into an adjacent gas path to form a vertical pocket, each of said sections having the opposite vertical side portion also extending into the adjacent gas path at an angle from an adjacent section to which it is secured to form a second vertical pocket therewith.

6. An elongate stripping vane section including a pair of transversely spaced portions lying in spaced parallel planes, an intermediate portion extending between and integral with said spaced portions, an edge portion integral with one of said spaced portions extending at an obtuse angle from said one of said spaced portions toward the plane of the other of said spaced portions, said edge portion terminating in a portion extending backwardly toward said one of said spaced portions and lying parallel to and spaced from said edge portion to form a vertical pocket therewith.

7. An elongate stripping vane section including, a pair of transversely spaced portions lying in spaced parallel planes, an intermediate portion extending between and integral with said spaced portions, an edge portion integral with one of said spaced portions extending at an obtuse angle from said one of said spaced portions toward the plane of the other of said spaced portions, said edge portion terminating in a portion extending backwardly toward said one of said spaced portions and lying parallel to and spaced from said edge portion to form a pocket therewith, said one of said spaced portions being of lesser width than said other of said spaced portions, said edge portion being of lesser width than said intermediate portion.

8. A stripping vane including, a plurality of elongate sections, each of said sections including a straight end portion lying in a plane and extending from one side edge of the section, a first inclined portion extending at an obtuse angle in one direction from said straight end portion, an intermediate straight portion of lesser width than the straight end portion extending at an obtuse angle in the opposite direction from the inclined portion and lying in a plane parallel to said first-mentioned plane, and a second inclined portion of lesser width than said first inclined portion extending at an obtuse angle in the same degree and on the same side of the intermediate straight section as the first inclined portion and having a curved channel portion on its outer end and within the obtuse angle formed between said second inclined portion and said intermediate straight portion, said obtuse angles all being equal in degree, the intermediate straight portion of each section abutting and being secured to the straight end portion of an adjacent section, with the second inclined portion of said each section abutting the first inclined portion of the adjacent section, the straight end portion of said adjacent section extending beyond the first inclined portion of the section to which it is secured to form a pocket therewith.

9. A stripping vane including, a plurality of elongate sections, each of said sections including a straight end portion lying in a plane and extending from one side edge of the section, a first inclined portion extending at an obtuse angle in one direction from said straight end portion, an intermediate straight portion extending at an obtuse angle in the opposite direction from the inclined portion and lying in a plane parallel to said first mentioned plane, and a second inclined portion extending at an obtuse angle in the same degree and on the same side of the intermediate straight section as the first inclined portion and having an end remote from said straight end portion provided with a curved channel portion disposed within the obtuse angle formed between said second inclined portion and said intermediate straight portion, said obtuse angles all being equal in degree, the intermediate straight portion of each section abutting and being secured to the straight end portion of an adjacent section, with the second inclined portion of said each section abutting the first inclined portion of the adjacent section.

10. An elongate stripper vane section comprising, a straight end portion lying in a vertical plane and extending from one side edge of the section; an inclined portion extending at an obtuse angle in one direction from said straight end portion; an intermediate straight portion of lesser width than the straight end portion extending at an obtuse angle from the inclined portion and lying in a plane parallel to said first mentioned vertical plane; and a second inclined portion of lesser width than said first inclined portion extending at an obtuse angle in said opposite direction from the intermediate straight section and having an end portion extending arcuately in said opposite direction and then extending back toward said intermediate straight portion parallel to and spaced from said second inclined portion, said obtuse angles all being equal in degree.

11. An elongate stripper vane section comprising, a straight end portion lying in a plane and extending from one side edge of the section; an inclined portion extending at an obtuse angle in one direction from said straight end portion; an intermediate straight portion extending at an obtuse angle in the opposite direction from the inclined portion and lying in a plane parallel to and spaced from said first-mentioned plane; and a second inclined portion extending at an obtuse angle in said opposite direction from the intermediate straight section and having an end portion extending arcuately in said opposite direction and then extending back toward said intermediate straight portion parallel to and spaced from said second inclined portion, said obtuse angles being equal.

EDWIN W. SMITH.

References Cited in the file of this patent

UNITED STATES PATENTS

| Number | Name | Date |
|---|---|---|
| 1,616,802 | Hosch | Feb 8, 1927 |
| 1,686,144 | Colbert | Oct. 2, 1928 |
| 1,803,854 | Kniskern | May 5, 1931 |
| 1,896,656 | Anderson | Feb. 7, 1933 |
| 1,928,706 | Sillers | Oct. 3, 1933 |
| 2,180,586 | Gustafsson | Nov. 21, 1939 |
| 2,440,860 | Kalmeyer | May 4, 1948 |